March 5, 1968     R. P. LUBOLD     3,371,906
IRIS VALVE
Filed Jan. 14, 1965     4 Sheets-Sheet 1
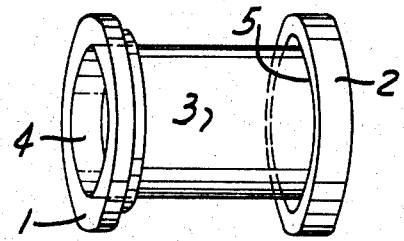
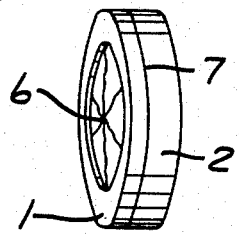
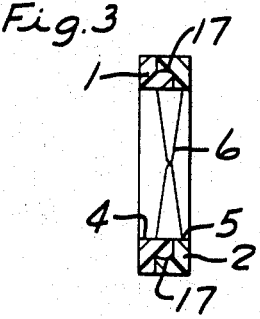
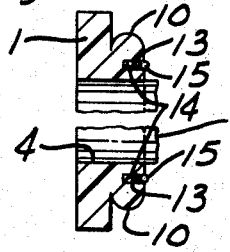
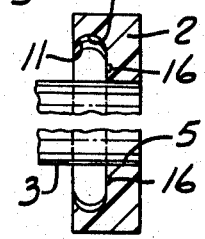
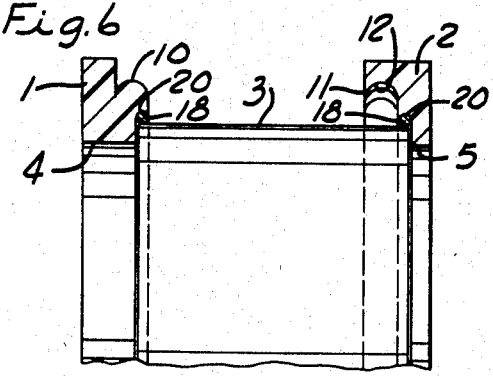
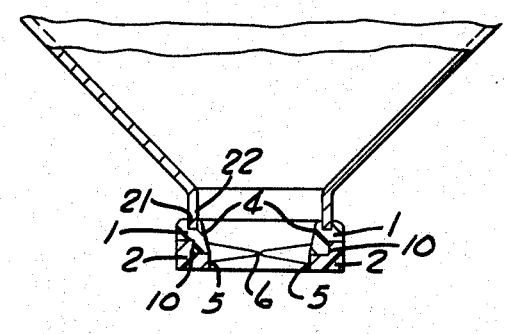
INVENTOR.
RICHARD P. LUBOLD
BY
CAROTHERS AND CAROTHERS
HIS ATTORNEYS March 5, 1968 R. P. LUBOLD 3,371,906
IRIS VALVE Filed Jan. 14, 1965 4 Sheets-Sheet 2

INVENTOR.
RICHARD P. LUBOLD
BY
CAROTHERS AND CAROTHERS
HIS ATTORNEY

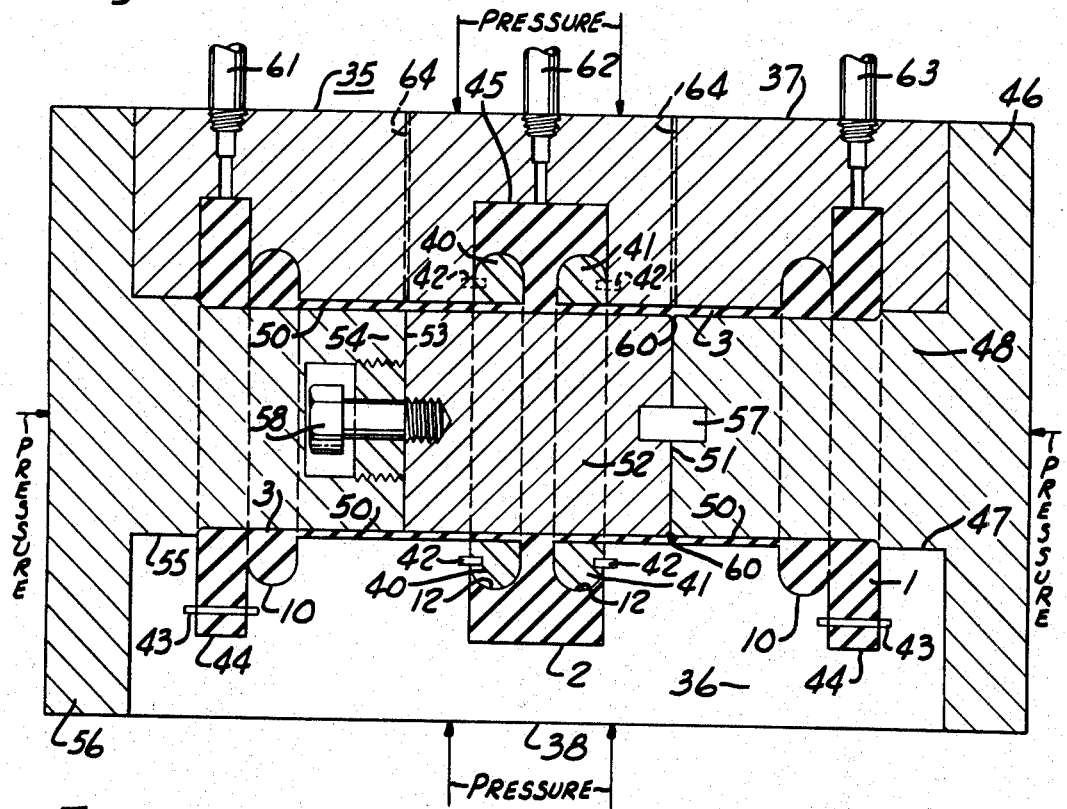
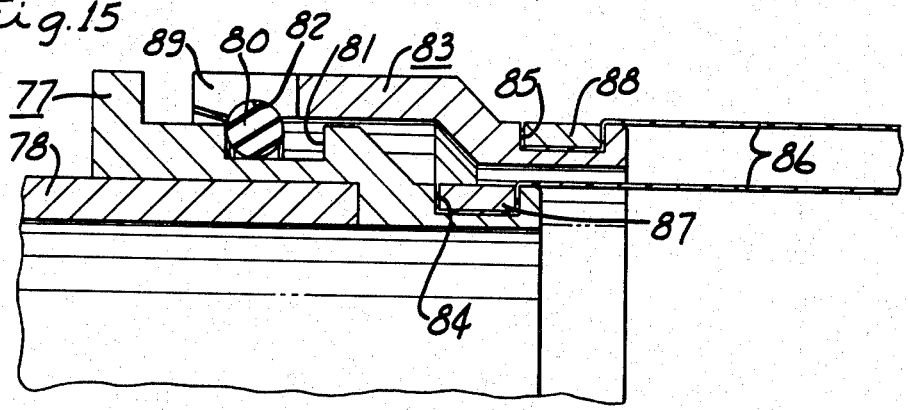

March 5, 1968 R. P. LUBOLD 3,371,906
IRIS VALVE

Filed Jan. 14, 1965 4 Sheets-Sheet 4

INVENTOR.
RICHARD P. LUBOLD
BY
CAROTHERS AND CAROTHERS
His ATTORNEYS

United States Patent Office 3,371,906
Patented Mar. 5, 1968

3,371,906
IRIS VALVE
Richard P. Lubold, Indiana, Pa., assignor to Link-Belt Company, a corporation of Illinois
Filed Jan. 14, 1965, Ser. No. 425,391
10 Claims. (Cl. 251—4)

ABSTRACT OF THE DISCLOSURE

An iris valve having a flexible sleeve connected at spaced annular positions therealong to the bores of a plurality of rings at least one of which may be mounted on a tubular member and the other having relative rotary movement to twist the sleeve and close the bores of the rings. Adjacent faces of the rings having concave and convex bearing sockets disposed axially of the rings which when flexed are snapped into and out of mating interengagement. The aligned annular surfaces on the bores of the rings are spaced axially of said bearing surfaces to which said sleeve positions are secured. Thus the bearing surfaces are wholly contained within the rings themselves and one or the assembly of the rings may be detachably secured to a tubular member through which material is to pass and which is valved by the iris sleeve. The flexing of a ring will disengage the bearing surfaces of the rings for quick repair or replacement and the sleeve may be made integral with the rings and of the same material thus protecting the bearing surfaces.

---

This invention relates generally to iris valves having a plurality of rings interconnected with a sleeve twisted into an iris by the relative rotation of at least one of the rings and more particularly to an iris valve constructed with rings having interconnecting members that snap together for relative rotation to open and close the sleeve means that forms the iris therebetween.

The principal object of this invention is the provision of a snap on interconnecting member on adjacent rings of an iris valve that holds the rings assembled for relative rotary movement to each other. These inter connecting members are in the form of an annular undercut providing an undercut groove in the face of one ring which forms a female member and an annular radial extension on the face of the opposed ring to form a male member that is complementary to the female member and snaps therein to support one or the other ring for relative rotary movement to twist the flexible sleeve means made integral with the ring bores to form an iris. These snap on male and female members may be flexible members attached to the rings or the rings may be made of rigid material, but sufficiently small in cross section but large in the ring diameter so as to be sufficiently flexible to permit the rings to snap together but when one is mounted on a bin or other member it is difficult if not impossible to pull them apart. The smaller sizes may be made of plastic material. Thus these snap members will give sufficiently when two inches in diameter to snap in place and may be readily unsnapped. Thus the material is not a factor insofar as the snap on interengaging male and female members that holds the rings in rotary assembled relation to permit one ring to be rotated relative to the other to operate the flexible iris sleeve.

The material is important when it is desired to mold the valve rings and sleeve means as a single unit. Injections may be made to each ring which after being filled permits the material to flow through the thin mold sections from opposite directions to meet and integrate to form the flexible sleeve out of the same material. A three ring valve may be injectioned molded the same way with two sleeve means. In the formation of the sleeve means an expansion chamber or gate may be made in the mold adjacent the intermediate portion of the sleeves to produce an annular head that circumvents the sleeve. This bead may be a thin annular flange that has the same thickness sas the sleeve and the mold cavity of the same must be completely filled to produce the valve. This insures integration at the bead and the completed sleeve.

Various materials may be used to make the valve comprising this invention including the flexible sleeve means. The most widely known materials for a good flexible sleeve are nylon and Dacron. Another good material is Fairprene which is a special rubber on nylon taffeta. This type of sleeve material is impervious as against nylon and Dacron to fine powders and dust and, therefore, ideal for handling such materials. Latex rubber and thin urethane may also be used as sleeve materials.

Another material, referred to as "conductive rubber" is ideal as a sleeve material where static electricity is a problem. Conductive rubber sleeve material consists of rubber carbon impregnated on nylon. It is well known that carbon is a conductor and thus, as applied, gives the sleeve the ability to conduct away static electricity keeping the valve mouth open and clean of material. The rubber is present only as a binder in order to keep the carbon intact. Since rubber is used as a binder, a conductive rubber sleeve is also impervious to dust penetration even though not as much as the Fairprene materials. These materials are also abrasion resistant although the Fairprene material is better in this regard since there is a substantial rubber coating on the surface of the nylon material as compared to conductive rubber material which takes only a thin rubber coating for purposes of a binder to retain the carbon content.

The rings of the iris valve may be of any suitable plastic material. The rings also may be made of metal such as aluminum which is light in weight and easily machinable to specifications.

In the case of molding the valve rings and sleeve means as a single unit, polyethylene plastic would be suitable material.

Another object is the provision of a coating or a roughened surface on the male or female surfaces or on both to permit the rings to turn but require a force that is necessarily applied to rotate the ring that is not mounted. In this way the smooth and slick cooperating surfaces of the snap-on will not open with pressure on the iris or an unauthorized opening due to vibration.

Another object of this invention is the provision of a snap-on or coupling that is fastened to the rings that is located on the faces of the rings to cooperate with each other and provide a substantial bearing surface therebetween not only in the male and female coupling but also the adjacent radial faces.

Another object is the provision of a method to produce this valve as an integral body. The rings and the sleeve may be the same material by a simultaneous dual injection for each ring with a common leaching passage from the bore of each ring to the opposite ring which leaching passage is considerably smaller to form the flexible sleeve and requires a higher pressure after the first stage after filling the ring mold cavities and each leaching passage connects with the same passage of the adjacent ring to complete the sleeve and integrate the ends. The mold for this object is novel in that the cores defining the bores of each ring also carries the mold surface for the sleeve sections, one from each ring. The mold section may place the bead where the sleeve parts join on the inside or the outside of the sleeve. This escape or bead chamber gives body to the center of the sleeve where it is twisted the most and permits a better seal.

Another object is the provision of a spring biased detent carried by one ring to engage the other ring at the fully closed position of the valve or at any other predetermined open position.

Another object of this invention is the adaptation of this iris valve to a container such as bottles made from glass or plastic, cardboard bottles or cans, metal cans and bags and flexible tubes, which containers may be employed for transporting and dispensing granules, powders, liquids, slurries or pastes.

Another object of this invention is the adaptation of this snap valve for use in closures to provide the control of a wide range of fluids, liquids or gases which may readily be opened to be cleaned or to be placed on another container or may be closed to retain the materials therein.

One or more spring biased detents may be employed in this snap valve to graduate the degree of openings for dispensing material in predetermined amounts from containers or from hoppers, bins or chutes.

Another object of this invention is the provision of a snap-on iris valve having complementary feeding male and female rings wherein the diameter of the complementary ring provides a slight difference from each other allowing their assembly and depending upon the flexibility of the material or the size of the ring to permit the complementary parts to be interengaged by snap action. A ring of small cross section and large in diameter would be flexible sufficiently to allow this snap action when made of steel. Whereas made of small diameters, the plastic would be sufficiently flexible to allow the rings to snap into position.

Other objects and advantages appear hereinafter in the following description and claims.

The accompanying drawings show for the purpose of exemplification without limiting this invention or the claims thereto, certain practical embodiments illustrating the principles of this invention, wherein:

FIG. 1 is a perspective view of the iris valve comprising this invention with the rings separated.

FIG. 2 is a perspective view of the iris valve comprising this invention with rings assembled.

FIG. 3 is a sectional view of the iris valve of this invention with the rings snapped into position.

FIG. 4 is an enlarged view of the male ring.

FIG. 5 is an enlarged view of the female ring.

FIG. 6 is a sectional view showing the rings separated illustrating the modified form of securing the sleeve.

FIG. 7 shows the application of the valve comprising this invention to a bin or hopper or other type of container.

FIG. 12 is a sectional view illustrating a tri-ring iris valve in an injection mold.

FIG. 15 is a sectional view illustrating still another form of the valve comprising this invention.

Figure 8:
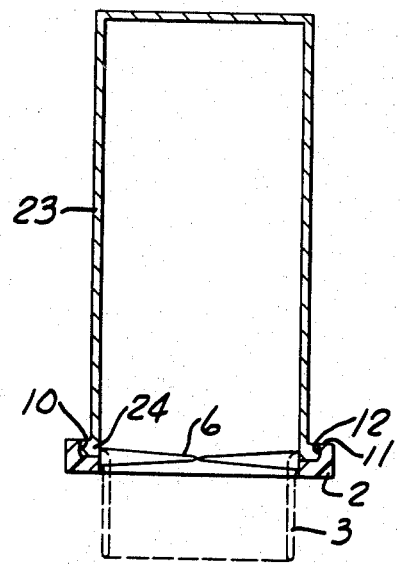
FIG. 8 is a sectional view showing the iris valve as applied to a container, the mouth of the container forming the male ring.

Referring to FIG. 1 the iris valve comprising this invention is provided with a male ring 1 and a female ring 2 which are arranged for co-axial mounting and are provided with a detachable or integral sleeve means 3 which is secured to aligned surfaces on the bores 4 and 5 respectively of the rings 1 and 2. If the rings are snapped together as shown in FIGS. 2 and 3 so as to be assembled as shown in FIG. 2 but without rotating one ring relative to the other, the sleeve 3 remains straight and provides a full passage through the bores of the rings. However, when one of the rings is twisted relative to the other, this flexible sleeve means 3 is closed in the form of an iris as illustrated at 6 in FIG. 2 and the seam between the rings is illustrated at 7 and when twisted in this manner it closes the passage between the rings.

Referring now to FIGS. 3 to 5 the ring 1 is provided with an annular radial extension 10 which is slightly larger in diameter than the annular rim 11 forming the undercut 12 in the ring 2 which undercut forms an annular female member socket and when the one side of the extension 10 is placed in the undercut or recess 12 the male member may be snapped into the female member by a deflection of the annular rim 11.

One or more small sockets such as shown at 13 may be placed in the lateral face of the extension 10 to receive the helical spring 14 and the ball member 15. The hole forming the socket 13 may be reduced at its mouth after the ball is inserted so as to retain the same in position with the spring forcing the ball outwardly. Complementary detents 16 may be placed in the complementary face of the female socket for receiving the ball members 15 for the purpose of locking the relative rotary position of the rings 1 and 2 and thus maintain them closed, open or at any desirable intermediate position as the case may be.

As illustrated the sleeve 3 is secured in the bores 4 and 5 of the rings 1 and 2 and this sleeve may be formed integral with the bore even though it is not the same material but the sleeve is flexible and when assembled the rings are readily rotatable relative to each other. However, this rotation may be dampened by the application of a friction material on one or both the extension 10 and the undercut 12 such as indicated at 17 in FIG. 3. This may be a nap friction material or these members may be merely subjected to a sand blasting so that the coacting faces are somewhat roughened and prevent relative rotation of the rings. However, it should be noted that in view of the fact that the sleeve is secured to the bores of these rings, the cooperating complementary coupling portions of the rings 10 and 12 are in no way associated with the interior of the sleeve other than maintaining the rings at a relative position to determine the degree of opening or closure of the sleeve.

As shown in FIG. 6 the sleeve 3 is made integral with the snap rings 18 that are placed in corresponding booths 20 in the rings 1 and 2. This construction is operable. However, the preferred form is to secure the sleeves 3 to the bores of the rings rather than to this inner face.

As shown in FIG. 7 the male ring 1 is provided with an annular groove 21 in its outer face to receive the hopper mouth 22. Here the iris is shown closed at 6 for the purpose of retaining the material in the hopper.

In the structure shown in FIG. 8 the container 23 has an enlarged mouth 24 which is constructed with the male extension member 10 to be received in the ring 2 with its corresponding female undercut 12 defined by the annular rim 11. Here the diaphragm is enclosed as an iris as shown in FIG. 6 but as shown in dotted lines it is shown to be open. Thus a portion of the ring may be constructed as a part of the container regardless of which ring is employed.

Figure 9:
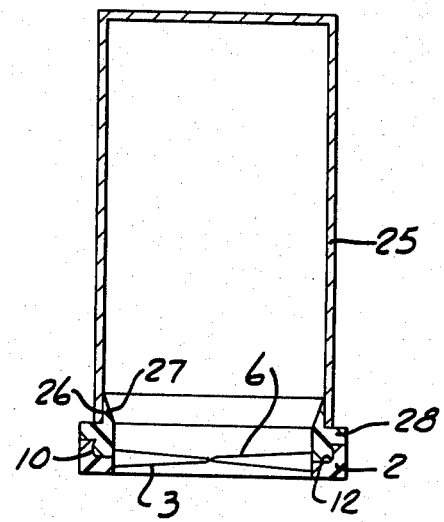
FIG. 9 is a sectional view of the iris valve applied to a container wherein one of the rings is detachably secured to one end of the container.

In FIG. 9 the container 25 has an annular opening 26 to receive the formed pressure mounting 27 on the male ring 28 which is received in the female ring 2. Here again the iris is closed as indicated at 6 causing the sleeve 3 to be twisted in the manner previously described. This structure shows that one of the rings may be constructed to fit the opening of any container and the containers in FIGS. 8 and 9 are both shown inverted so that the iris valve is not only a closure but also a dispenser of the material from these containers.

Figure 10:
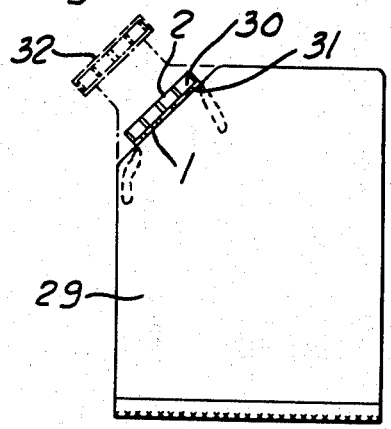
FIG. 10 is a view showing the iris valve applied to a chemical container.

In FIG. 10 is shown a chemical container or bag 29 with a pop-out type of discharge for funneled flow in combination with the iris valve comprising this invention. The valve with its flexible connection is permitted to be retracted into the container or bag 29 to protect the valve during shipping or storage. The female ring 2 may be readily turned to open or close the mouth 31 formed by the sleeve means 3.

When chemicals or other materials are to be taken from the container, the cap 32 may be removed from the container and the valve pulled out from the container to its extended position as shown in dotted line in FIG. 10. In this extended position the valve may be opened or closed to the extent required to discharge the bag 29 when the bag is inverted. It should be noted that the valve may assume the extended position upon inverting the bag 29. The outer cap 32 is employed to seal over the valve for the purpose of storage or shipment.

Figure 11:
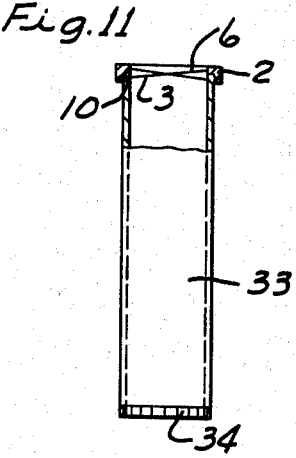
FIG. 11 is a view showing the iris valve applied to a paste tube.

In FIG. 11 the paste tube 33 is sealed at one end as illustrated at 34 and is provided with an iris closure. Here the tube is provided with a similar construction wherein the mouth of the tube is provided with the annular male extension 70 and the ring 2 has been twisted to illustrate the sleeve 3 forming an iris in its closed position as illustrated in FIG. 6. Thus toothpaste or other similar materials may be dispensed from a tube of this character wherein the tube and the sleeve and the ring 2 may all be formed in an injection mold from the same material. The injection mold may be placed on the ring 2 and on the annular extension 10 that takes the place of the ring 1 which injections will completely form the ring 1 and the ring 2 after which they will further form the sleeve 3 integrally between the rings and also form the tube 33 the latter being thicker or heavier in weight than the sleeve 3. However, this whole device may be injection molded to provide a complete device even to the roughness on the coacting edges 10 and 12 to prevent accidental opening or turning of the ring 2 to open the iris.

Referring to FIG. 12 the injection mold body may be feasibly employed for making a tri ring mold which comprises the cylindrical body 35 which is made in two parts separable on the axial plane in the face 36 of the cylindrical body 35 which is made in two parts one indicated at 37 and the other at 38 and has demountable rings 40 and 41 held by the pins 42 which pins are open to the parting face 36 to permit these rings to be lifted and detached from the mold halves 37 and 38. The rings themselves are split on the same plane 36 as illustrated. Thus they are readily removable from the mold halves and when free they are readily removable from the molded article in the same manner as the male member 1.

In like manner the pins 43 are removable from the extensions 44 of the rings 1 and when the valve rings are assembled a mounting pin is passed through the holes made by the pins 43 and riveted together to hold them in assembled relation. This pin functions as a stop for the handle or extension 45 in the center ring 2 which when turned relative to the rings 1 will close an iris on each side of the ring 2.

The mold halves 37 and 38 when assembled have the core members inserted therein. The core member 46 has its flanged head engaging the mold parts 37 and 38 and the bore section 47 of the mold halves has the core section 48 fitting therein until it reaches the edge of the ring 1 after which the core is reduced in diameter to form the chamber 50 that provides for the flexible sleeve 3 extending from the bore of each end ring and in opposite directions from the bore of the center ring, all of which constitute aligned annular attaching surfaces in the bores of said rings. The end of the core 48 is indicated at 51 where it engages the end of the intermediate core 52 the opposite end 53 of the intermediate core 52 engages the end of the core 54 which is integral with the full core diameter 55 on the end head member 56. The core members 48 and 52 when engaged are aligned by the pin member 57 whereas the core member 54 is provided with a bolt 58 that is threadably engaged in the intermediate core 52. Thus the bolt 58 and the pin 57 keep the intermediate core 52 properly aligned to continue the chamber 50 from one end of the mold to the other end and the removal of the core head 56 will cause the bolt 58 to remove the intermediate core section 52. By forming the core section 48, 52 and 54 in the manner described an alleviating chamber 60 is provided between the central core member 52 and the two outer core members 48 and 54. This alleviating chamber insures that the chamber 50 is filled with plastic material and if the mold halves 37 and 38 are removed from the assembly the core heads 46 and 56 will be readily withdrawn axially as the beads formed in the chamber 60 are permitted to expand sufficiently to withdraw the center core member 52. This relief may also be placed in the mold halves 37 and 38 which would place the beads on the outside of the sleeve 3.

There are three injection nozzles shown in the mold member 37, one at 61, 62 and 63. These injection nozzles force the materials therein simultaneously and if any bleed holes are necessary they may be placed as indicated at 64 in the mold section 37 at the bead chamber 60.

The rings 1 and the double ring 2 will be the first to fill because they offer little resistance to the injection pressure and when the injection pressure builds up the molding material passes through the chamber 50 in opposite directions from the double ring member 2 and meet with the injection material coming from the rings 1 and bleed at the bleed holes 64. These bleed holes coming from the bead cavity 60 provide a reinforcing on the sleeve in the place where it gets the greatest twisting action. As stated before the cavity 60 may be in the mold halves 37 and 38 at the same positions to put the beads on the outside. As far as the bleed holes 64 are concerned this makes no difference as they will bleed the air out of the mold and produce a flow to form the sleeve. When the bleed hole starts to fill the injection pressure will go up at a very fast rate indicating that the bleed holes have been reached in which case the pressure is immediately reduced and the mold is ready for emptying.

If the structure is made as shown in FIG. 12 the mold is unclamped from its annular and axial pressure clamping members and is opened allowing the mold section 38 to leave the mold section 37 after which the molded particles and the cores are removed from the mold halves and are then disassembled and the mold again reassembled for the next mold injection.

Molding of the structure similar to that shown in FIG. 1 would be in the same manner as that of FIG. 12 as the pin 43 may be employed to form a stop on a two ring mold as well as a three ring mold.

After the iris valve structure shown in FIGURE 12 is removed from the mold it is seen that it represents an integral tri-ring structure which when snapped together provides a central ring with a concave bearing socket on each face to cooperatively receive the convex bearing means on each adjacent ring. The integrally formed sleeves will be disposed in the direction of the flow of material and when mounted on a container or tubular member these sleeves will be closed by the rotation of the center ring relative to the end rings when the latter are held or if the center ring is held and the end rings are rotated the same effect is produced.

Figure 13:
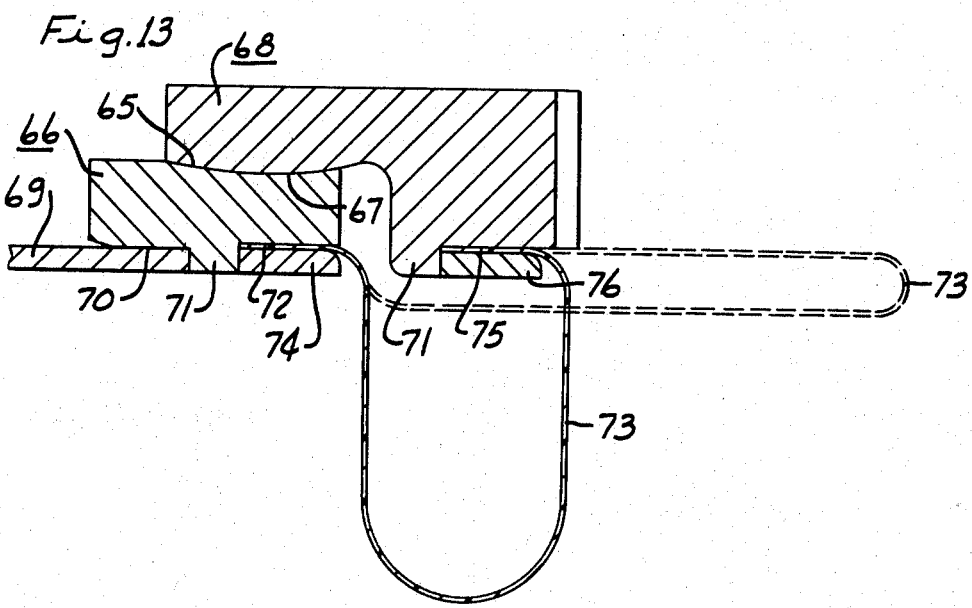
FIG. 13 is a sectional view illustrating an inverse form of the valve comprising this invention.
Figure 14:
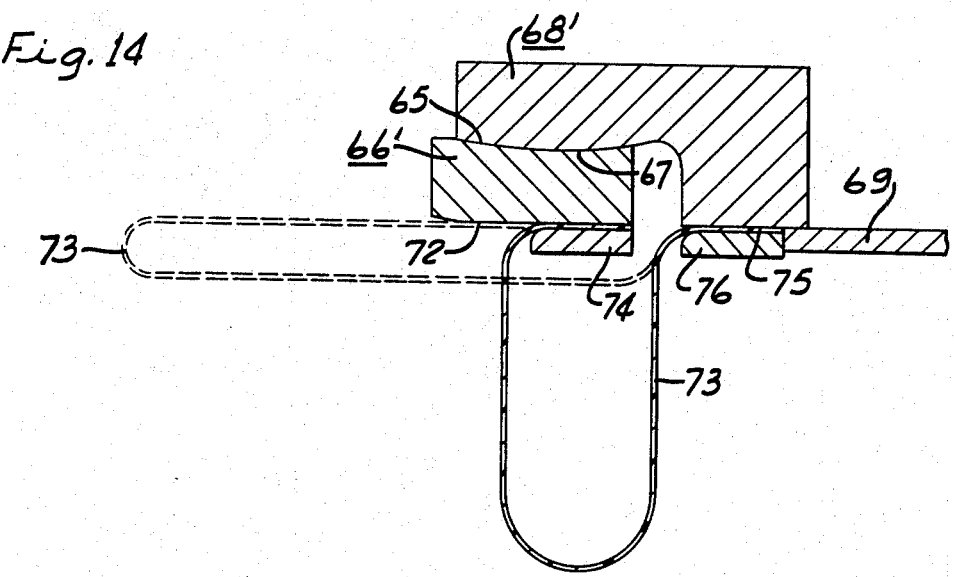
FIG. 14 is a sectional view illustrating a modified form of the valve structure shown in FIG. 13.

In the structure of the previous figures the annular radial extension 10 has been convex in cross section and its complementary port 12 is concave. This structure may take the inverse form as shown in FIGS. 13 and 14 which not only provides a concave undercut or female socket bearing surface 65 for the inner ring 66 and 66' but has a mating convex extension or male bearing surface 67 on the outer ring 68 and 68'. The bore 70 of the inner ring 66 has an annular stop 71 and the bore on the other side of this stop is enlarged as indicated at 72 to receive one end of the flexible sleeve 73 held in place by the inner clamp ring 74. The bore 75 of the ring 68 is the same size as the bore 72 to receive the opposite end of the sleeve 73 that is clamped in place by the clamping ring 76. This clamping ring also engages a stop 71 in the bore of the ring 68. The inner ring 66 may be secured to the mouth of a container or the end of a tube or chute. However, the sleeve 73 when opened will lie parallel with the central axis of the rings and open to permit free flow. This is due to the fact that the sleeve lies in the same direction when clamped by their rings 74 and 76 even though folded back.

Another feature of the valve comprising this invention is limiting the true length of the sleeve 73 so that the sleeve length, when the valve is open, is not as long as the diameter of the valve. Thus, the sleeve 73 becomes prestretched upon closing of the valve when the iris is completely shut. To this extent the sleeve is self-opening since the elasticity of the sleeve upon being closed and therefore, prestretched, tends to cause the sleeve to open. This self-opening feature permits the sleeve to open freely for free flow of material. The sleeve 73 will open and lie parallel with the central axis of the rings without depending upon the pressure of the material contained to open the sleeve. This self-opening feature provides a greater control over the amount of flow of material through the valve mouth.

In the structure of FIG. 14 in the rings 66' and 68' the stops have been omitted and the clamping rings 74 and 76 hold the flexible sleeve 73 within the bore 72 and 75. As previously stated the ring 66' is usually connected to the container or forms the end of the chute, whereas the ring 68' is the outer ring member that is rotated relative to the ring 66' for the purpose of closing the sleeve 73 in the form of an iris.

In view of the fact that the ring 68' is secured to the container 69 the inner ring 66' will be rotated to open the sleeve 73 as indicated in dotted lines, which is in the direction opposite to that shown in FIG. 13.

Thus FIGS. 13 and 14 show substantially the same structure for supporting the sleeve 73 with the sleeve opening in opposite directions and as previously stated the sleeves when mounted in the manner as shown in FIGS. 13 and 14 will extend themselves axially of the bore of the rings mounted in the manner as illustrated.

Referring now to FIG. 15, the ring 77 is mounted on a container or chute 78 and carries an O ring member 80 between the outwardly open slot 81 of the ring 77 and the inwardly arcuate slot 82 in the ring 83. Thus the ring 83 has relative rotary and axial movement within the limits of the actual dimension of the slot 81.

Each of the rings 77 and 83 is provided with a sleeve retaining slot 84 and 85 respectively in which the ends of the sleeve 86 are clamped by the clamping rings 87 and 88. Here again as in each of the foregoing structures the outer ring 83 will snap over the O ring member 80 and be retained by the annular groove 81 but one may rotate the ring 83 relative to the ring 77 and thus cause the sleeve 86 to form an iris and close the passage of the member 78.

Thus regardless of the construction of the two rings as illustrated in FIGS. 1 through 11 and that shown in FIGS. 13, 14 and 15 the outer ring is capable of flexing to snap over the inner ring and if the material is such that it does not have material flexibility the outer member may be slotted as indicated at 89. This portion of the ring may be slotted in four positions at 90° apart, which would be at the cardinal points of the circle. The slot would be sufficient to allow the material forming the arcuate annular groove 82 to expand and allow the insertion over the O ring member 80 without breaking the ring or otherwise disrupting the rotary movement of the outer ring 83 on the O ring member 80.

It should be noted that the O ring member 80 will provide sufficient frictional contact depending on the application of the valve and will remain in any selected position and this is even true if a shorter sleeve 86 is used and thus causing a prestretched condition, as explained above, in closed position of the valve. To solve the problem of holding a prestretched sleeve in any selected position between a fully opened valve and fully closed valve, elastic O ring 80 is used. Annular grooves 81 and 82 may be made both arcuate in cross section and somewhat smaller in radius than the radius of the elastic or rubber ring so that a self-locking action is provided no matter what position the valve is in. The O ring provides the necessary friction between the rings 77 and 83 as well as alignment thereof. The frictional contact is sufficient to permit positioning of the two rings 77 and 83 relative to one another in any position between fully open and fully closed position of the valve.

I claim:

1. An iris valve having a plurality of rings for mounting coaxially adjacent to each other with a flexible sleeve means having its ends made integral at the bore of a respective ring to provide a passage through said rings and when at least one of said rings is rotated relative to its adjacent ring to twist said flexible sleeve means in the form of an iris and close the passage through said rings, characterized by an annular undercut groove in the face of one ring forming an annular female bearing member socket, an annular radial extension in the opposed face of the adjacent ring to form a complementary male bearing member frictionally held by said undercut female bearing member socket groove to revolve therein to align the ring bores, said bearing members being sufficiently flexible to permit said bearing members to be snapped into and out of mating engagement but to be frictionally retained therein for relative rotary movement of said rings to open and close the iris valve which is in the form of a contiguous flexible sleeve between said rings, said frictional engagement being sufficient to frictionally retain the valvular positioning of said flexible sleeve.

2. The iris valve of claim 1 characterized by roughened engaging complementary surfaces on said male and female bearing members in frictional engagement to align the ring bores having a retarding action to prevent accidental relative rotary movement of said rings that would change the setting adjustment of said valve.

3. The iris valve of claim 1 characterized in that the diametral dimension of said rings is many times that of their cross sectional dimensions to provide a snap action to engage and disengage said bearing members.

4. The iris valve of claim 1 characterized in that said male and female bearing members are on adjacent radial faces on said rings.

5. The iris valve of claim 1 characterized in that there are only two rings with one sleeve means therebetween.

6. The iris valve of claim 1 characterized in that there are three rings the center ring having mating bearing members for cooperating with the adjacent bearing members on the adjacent face of the ring on each side thereof, said flexible sleeve means extending between each end ring and the center ring.

7. In an iris valve having a flexible sleeve connected at spaced annular positions therealong to the bores of a plurality of rings at least one of which may be mounted on a tubular member and the other having relative rotary movement to twist the sleeve and close the bores of said rings, characterized by a seating means including annular interengaged mating concave and convex bearing sockets disposed on adjacent faces of said rings which are sufficiently flexible to be snapped into and out of mating interengagement, aligned annular surfaces on the bores of said rings spaced axially of said bearing surfaces to which said spaced annular positions of said sleeve are secured, said convex bearing being frictionally held by the undercut concave bearing socket to align the ring bores relative to each other to open and close the iris valve which is in the form of a contiguous flexible sleeve between said rings, said frictional engagement being sufficient to frictionally retain the valvular positioning of said flexible sleeve.

8. The iris valve of claim 7 characterized in that said flexible sleeve and said plurality of rings are integral and of the same material and the flexible sleeve extends axially from the bore of adjacent rings and radially inwardly of said mating concave and convex bearing sockets.

9. The iris valve of claim 7 characterized in that said seating means also includes an annular elastic ring and adjacent annular slots in each of said rings for annular engagement with said annular elastic ring.

10. The iris valve of claim 7 characterized in that the said adjacent faces of said rings lie in radial surface contact.

References Cited

UNITED STATES PATENTS

| 1,431,918 | 10/1922 | Arthur | 222—507 X |
| 2,023,230 | 12/1935 | Hutton | 222—507 |
| 2,663,467 | 12/1953 | Douglass et al. | 251—4 X |
| 2,695,605 | 11/1954 | Gibbon | 251—9 X |
| 3,058,631 | 10/1962 | Hitte | 222—507 |
| 3,123,262 | 3/1964 | Douglass | 251—4 X |
| 3,131,835 | 5/1964 | Nakamura | 222—507 |
| 3,243,490 | 3/1966 | Ulmschneider | 264—328 |

FOREIGN PATENTS

| 634,975 | 3/1950 | Great Britain. |

ALAN COHAN, *Primary Examiner.*

R. GERARD, *Assistant Examiner.*